(12) United States Patent
Sibout

(10) Patent No.: US 7,387,410 B2
(45) Date of Patent: Jun. 17, 2008

(54) LUMINAIRE ASSEMBLY AND METHOD

(75) Inventor: Michel Sibout, Veniers (FR)

(73) Assignees: C.E.I.T. Corp., Plattsburgh, NY (US); C.E.I.T. Enterprises, Loudun (FR)

( * ) Notice: Subject to any disclaimer, the term of this patent is extended or adjusted under 35 U.S.C. 154(b) by 125 days.

(21) Appl. No.: 11/222,025

(22) Filed: Sep. 7, 2005

(65) Prior Publication Data

US 2006/0072329 A1    Apr. 6, 2006

Related U.S. Application Data

(60) Provisional application No. 60/607,255, filed on Sep. 7, 2004.

(51) Int. Cl.
*F21V 17/10* (2006.01)
*E05D 1/06* (2006.01)
*F24F 13/20* (2006.01)

(52) U.S. Cl. ............ 362/375; 362/480; 454/293; 16/254; 16/355; 16/365

(58) Field of Classification Search ............ 362/96, 362/154, 375, 480; 40/564, 568, 569, 574; 454/293, 294; 16/254, 271, 355, 365
See application file for complete search history.

(56) References Cited

U.S. PATENT DOCUMENTS

| | | | | |
|---|---|---|---|---|
| 3,469,089 | A * | 9/1969 | Picha | 362/220 |
| 3,663,990 | A * | 5/1972 | Shane | 16/269 |
| 3,863,372 | A * | 2/1975 | Stilling | 40/574 |
| 4,081,665 | A * | 3/1978 | Corbeil | 362/223 |
| 4,088,881 | A * | 5/1978 | Neer et al. | 362/223 |
| 4,200,905 | A | 4/1980 | Shelby et al. | |
| 4,317,163 | A | 2/1982 | Bont | |
| 4,387,415 | A | 6/1983 | Domas | |
| 4,415,957 | A | 11/1983 | Schwartz | |
| 4,516,343 | A * | 5/1985 | Stilling | 40/574 |
| 4,523,693 | A | 6/1985 | Bilson | |
| 4,907,142 | A * | 3/1990 | Burkarth | 362/480 |
| 5,172,976 | A | 12/1992 | Bogdanovs | |
| 5,420,763 | A * | 5/1995 | Vanderhoof | 362/480 |

(Continued)

OTHER PUBLICATIONS

Internet website www.trans-liteinc.com/interiorlighting.htm; Trans-Lite, Inc., Interior Lighting Jun. 7, 2005.

(Continued)

*Primary Examiner*—Ismael Negron
(74) *Attorney, Agent, or Firm*—Carter & Schnedler, PA.

(57) ABSTRACT

A luminaire assembly including a hinge member connected to a structure, a support member, a light source, and an outer shell. The support member is secured to the hinge member to be pivotable between a lighting position, in which electrical components are concealed, and a maintenance position, in which the electrical components are exposed. The light source is supported on a front side of the support member and is operational in the lighting position. The outer shell is secured to the hinge member such as to be pivotable between a closed position, in which the outer shell conceals the light source while being able to allow light from the light source to pass therethrough, and an opened position, in which the outer shell allows access to the light source. A hinge member and method for accessing the electrical components are also presented.

19 Claims, 7 Drawing Sheets

U.S. PATENT DOCUMENTS

| | | | |
|---|---|---|---|
| 5,440,466 A * | 8/1995 | Belisle et al. | 362/222 |
| 5,727,871 A | 3/1998 | Kotloff | |
| 5,997,158 A * | 12/1999 | Fischer et al. | 362/374 |
| 6,059,424 A | 5/2000 | Kotloff | |
| 6,082,879 A | 7/2000 | Myburgh | |
| 6,101,771 A | 8/2000 | Aikens | |
| 6,182,848 B1 | 2/2001 | Wang | |
| 6,439,741 B1 * | 8/2002 | Diaz et al. | 362/217 |
| 6,461,026 B1 | 10/2002 | Wang | |
| 6,530,681 B2 * | 3/2003 | Sieczkowski | 362/404 |
| 6,536,919 B1 * | 3/2003 | Johnson et al. | 362/265 |

OTHER PUBLICATIONS

Internet website www.luminatorusa.com/lumroot/rlight_01.html; Luminator USA; Luminator Rail; Interior Lights Jun. 7, 2005.

* cited by examiner

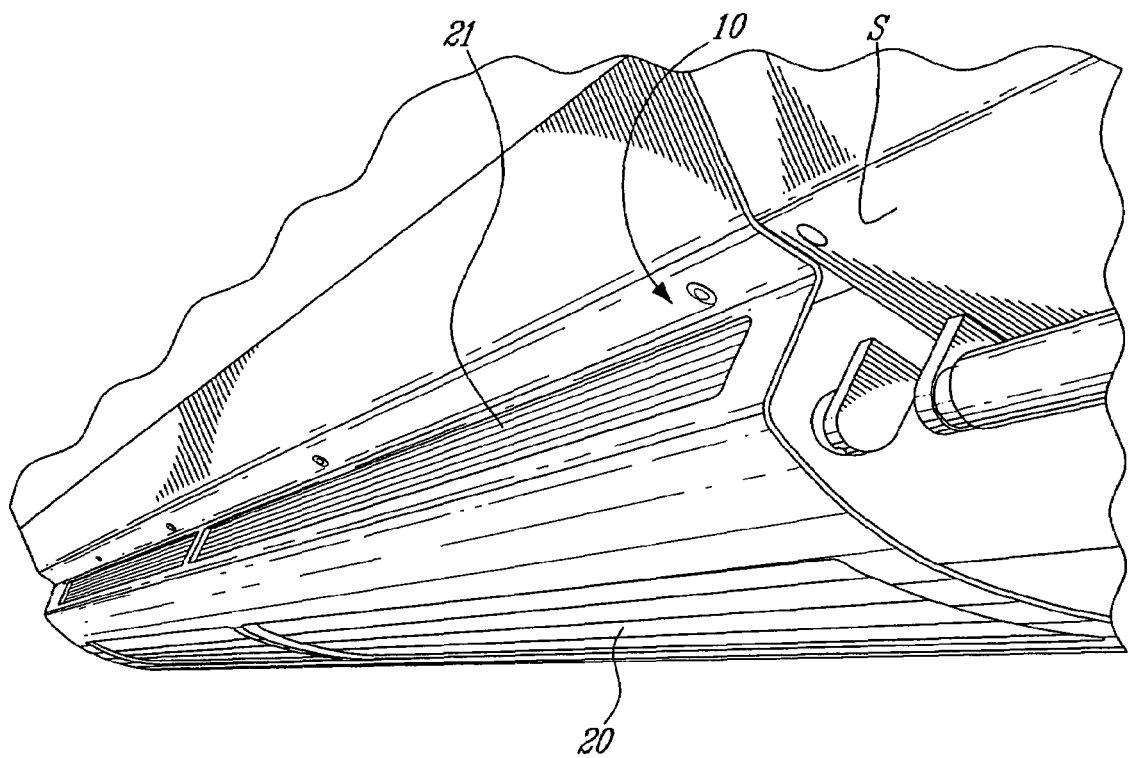
FIG_7
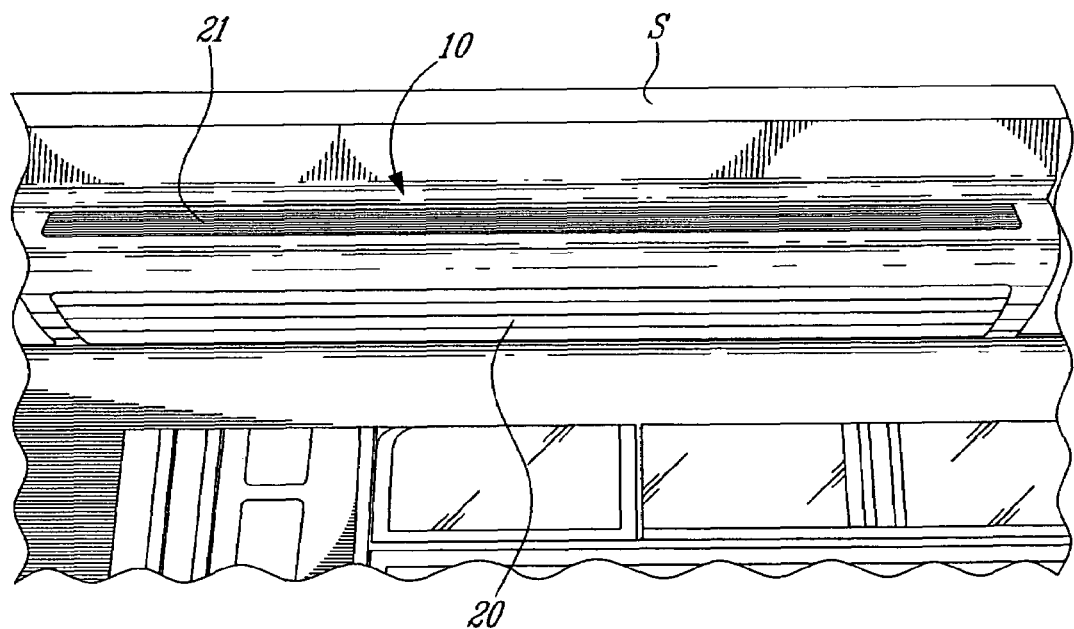
FIG_8

LUMINAIRE ASSEMBLY AND METHOD

CROSS-REFERENCE TO RELATED APPLICATION

The present patent application claims priority on U.S. Provisional Patent Application No. 60/607,255, filed on Sep. 7, 2004, by the present applicant.

TECHNICAL FIELD

The present invention generally relates to a luminaire assembly and, more particularly to a luminaire assembly used in public transport vehicles and public areas.

BACKGROUND ART

Luminaire assemblies using a fluorescent light source are often used in public transport vehicles, as they are typically energy efficient, with the fluorescent light source being durable with respect to other types of light sources. Such luminaire assemblies may be provided with reflective, refractive and/or diffractive components, the configuration of such components being an important design factor since it plays a key role in determining the light output. Moreover, as public transport vehicles and public areas are typically restricted in space, the sizing of luminaire assemblies installed therein is also an important design factor.

The maintenance of the luminaire assembly should be readily effected. Luminaire assemblies in general, and especially those found in series in public areas or in transport vehicles, should preferably have an interior which is easily accessed to facilitate, for instance, the change of the light source if necessary. Moreover, it is desired to minimize the amount of tools necessary for accessing the interior of such luminaire assemblies, while preferably being able to restrict access thereto to potential vandals.

It is known to combine a luminaire assembly with a ventilation duct. For instance, U.S. Pat. No. 6,082,879, issued Jul. 4, 2000 to Myburgh, discloses a combination light fixture/HVAC duct/advertising card holder in which the ballast and other electrical components are located within the ventilation duct. Such a configuration exposes the electrical components to potential contaminants present in the airflow, in addition to preventing servicing of the electrical components without perturbing the ventilation system. In addition, the light fixture does not appear to be readily removable for maintenance purposes.

Accordingly, there is a need for an improved luminaire assembly.

SUMMARY OF INVENTION

Therefore, it is an aim of the present invention to provide a novel luminaire assembly.

It is a further aim of the present invention to provide a luminaire assembly integrating a ventilation conduit.

It is a still further aim of the present invention to provide a luminaire assembly that is configured so as to ease maintenance thereof.

Therefore, in accordance with the present invention, there is provided a luminaire assembly comprising: a hinge member connected to a structure; a light source adapted to be connected to a power source through electrical components to produce light; an outer shell having a translucent portion and being operatively connected to the hinge member such as to be pivotable between a closed position, in which the outer shell conceals the light source within the luminaire assembly and allows light from the light source to pass therethrough to light up an environment of the luminaire assembly, and an opened position, in which the outer shell is pivoted away to allow access to an interior of the luminaire assembly; and a support member having a front side supporting the light source and a backside supporting the electrical components associated with the light source, the support member being operatively connected to the hinge member such as to be pivotable between a lighting position, in which the front side is exposed within the luminaire assembly such that the light source is in an operative position and is accessible, and a maintenance position, in which the backside of the support member is exposed within the luminaire assembly so as to allow access to the electrical components.

Further in accordance with the present invention, there is provided a hinge member for a luminaire assembly, the hinge member comprising: a tubular conduit portion in fluid communication with a ventilation source for circulating air through the tubular conduit portion; openings formed in the tubular conduit portion for passage of the air in/out of the tubular conduit portion; and a hinge portion connected to the tubular conduit portion and having a first receptacle in which a hinge connector of a lens member of a luminaire assembly is received, such that the lens member is pivotable with respect to the hinge member so as to access an interior of the luminaire assembly.

Still further in accordance with the present invention, there is provided a method for accessing electrical components associated with a light source in a luminaire assembly, the method comprising the steps of: i) releasing a first fastener of an outer shell of the luminaire assembly; ii) pivoting the outer shell so as to access an interior of the luminaire assembly in which a light source supported by a support member is exposed; iii) releasing a second fastener of the support member from the interior of the luminaire assembly; and iv) pivoting the support member so as to access the electrical components exposed on a concealed surface of the support member.

BRIEF DESCRIPTION OF DRAWINGS

A preferred embodiment of the present invention will now be described with reference to the accompanying drawings in which:

FIG. 7 is a perspective view, from a rear standpoint, of the luminaire assembly of FIG. 1 within a vehicle; and FIG. 8 is a perspective view, from a lateral standpoint, of the luminaire assembly of FIG. 1 within a vehicle.

DESCRIPTION OF PREFERRED EMBODIMENTS

Figure 1:
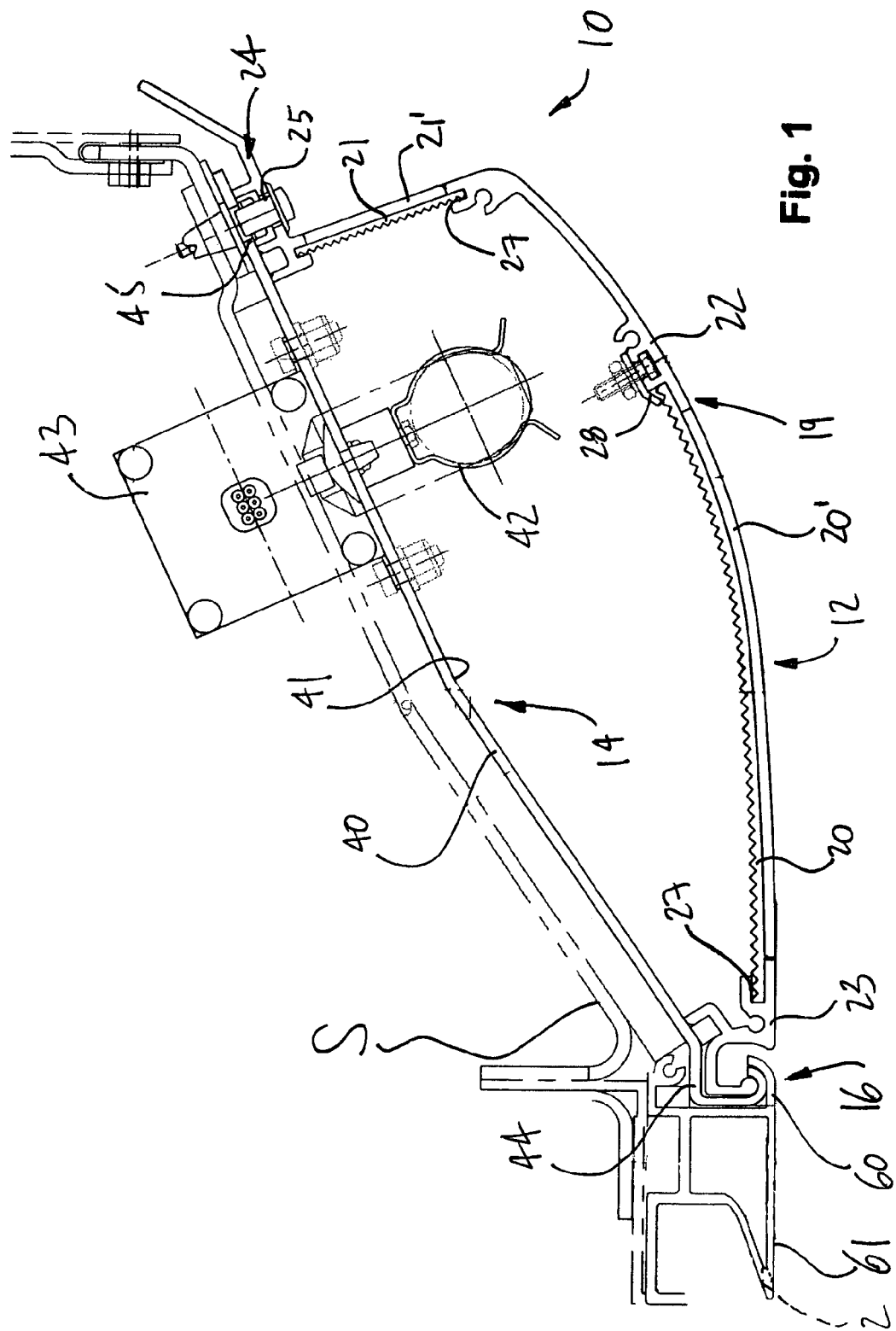
FIG. 1 is a cross-sectional view of a luminaire assembly in accordance with a preferred embodiment of the present invention, in a lighting position.

Referring to the drawings and, more particularly, to FIG. 1, a luminaire assembly in accordance with a preferred embodiment of the present invention is generally shown at 10. The luminaire assembly 10 is mounted to a structure S of a vehicle. The luminaire assembly 10 has a lens member 12, a reflector member 14, and a hinge member 16.

The lens member 12 is the visible outer shell of the luminaire assembly 10. The lens member 12 diffuses, refracts and/or allows light from a light source to pass therethrough. The lens member 12 conceals the components of the luminaire assembly 10.

The reflector member 14 is used to reflect light out of the luminaire assembly. The reflector member 14 is a support member that supports various components of the luminaire assembly 10.

The hinge member 16 supports the lens member 12 and the reflector member 14 to the structure S of the vehicle such that the lens member 12 and the reflector member 14 are pivotable to an opened, or maintenance, position, so as to access an interior of the luminaire assembly 10. The hinge member 16 may also used as a ventilation conduit so as to convey ventilation air, either as a diffuser or as an air return.

The Lens Member 12

Referring to FIG. 1, the lens member 12 in accordance with a preferred embodiment of the present invention has a first lens 20 and a second lens 21, secured to a body 19 having openings 20' and 21' therein for the first lens 20 and the second lens 21, respectively. The first lens 20 and the second lens 21 are separated by a connection plate 22 of the body 19. The first lens 20 and the second lens 21 are of a transparent or translucent material, so as to enable light from a light source within the luminaire assembly 10 to pass through the lens 20 and 21, and possibly be diffused or refracted.

A hinge connector 23 of the body 19 is adjacent to an end of the first lens 20 so as to cooperate with the hinge member 16, as will be described hereinafter. A fastener connector 24 of the body 19 is adjacent to an end of the second lens 21, and supports a fastener portion 25 that releasably engages a complementary fastener connector 45 of the reflective member 14. For instance, the fastener portion 25 of the lens member 12 is typically a bolt (or a ¼-turn connector), with the complementary fastener connector 45 having a tapped bore or other complementary connector portion for engagement with the fastener portion 25. As will be described hereinafter, the fastener connector 45, in addition to retaining the fastener portion 25, will secure the reflective member 14 to the structure S of the vehicle.

The lenses 20 and 21 are preferably releasably mounted to the body 19. As shown in FIG. 1, channels 27 are provided within the luminaire assembly 10, at the periphery of the openings 20' and 21', for receiving a periphery of the lenses 20 and 21. A catch 28 may also be used, to facilitate the installation of the lens 20.

The Reflector Member 14

Referring to FIG. 1, the reflector member 14 has a reflector plate 40. The reflector plate 40 has a reflective surface 41 facing toward the lens member 12. A light source 42 is mounted to the front side of the reflector member 14, on the reflector plate 40, so as to be received within a cavity formed between the lens member 12 and the reflector plate 40. A ballast 43, and like electrical components (e.g., power pack), are secured to a backside of the reflector plate 40, so as to receive a feed from a power supply and adapt the feed for the light source.

A hinge connector 44 is provided at an end of the reflector plate 40 so as to cooperate with the hinge member 16, whereby the reflector member 14 is pivotable with respect to the hinge member 16, as will be described hereinafter. Moreover, the hinge connector 44 is shaped so as to serve as a receptacle to accommodate the hinge connector 23 of the lens member 12.

The fastener connector 45 (i.e., ¼-turn connector, cam head connector or the like) is positioned at an opposed end of the reflector plate 40 and grips to the structure S, whereby the reflector member 14 is releasably connectable to the structure S in the manner shown in FIG. 1, as will be described hereinafter.

The Hinge Member 16

Referring to FIG. 1, the hinge member 16 has a hinge portion 60 extending from a conduit portion 61.

The hinge portion 60 defines a receptacle so as to accommodate the hinge connector 23 of the lens member 12, and the hinge connector 44 of the reflector member 14. More specifically, the hinge connector 23 is nested in the hinge connector 44, which is nested in the hinge portion 60 of the hinge member 16, such that both the lens member 12 and the reflector member 14 are pivotable individually with respect to the hinge member 16.

The hinge member 16 has a conduit portion 61 through which air circulates. Air may enter or exit the conduit portion 61 (depending on the use of the conduit portion 61) through openings 62. The conduit portion 61 of the hinge member 16 is therefore in fluid communication with an inlet or an outlet of a ventilation blower that will induce air circulation in the conduit portion 61, either as an air diffuser, or as an air return. The hinge member 16 may for instance consist of an extruded member.

Maintenance of the Luminaire Assembly 10

The luminaire assembly 10 of the preferred embodiment has been designed to allow relatively easy access to its various components.

Referring to FIG. 1, the lens member 12 and the reflector member 14 are both shown in a closed, or lighting, position. In this position, the lens member 12 is connected to the structure S via the fastener connector 24, which holds the lens member 12 to the structure S.

Figure 2:
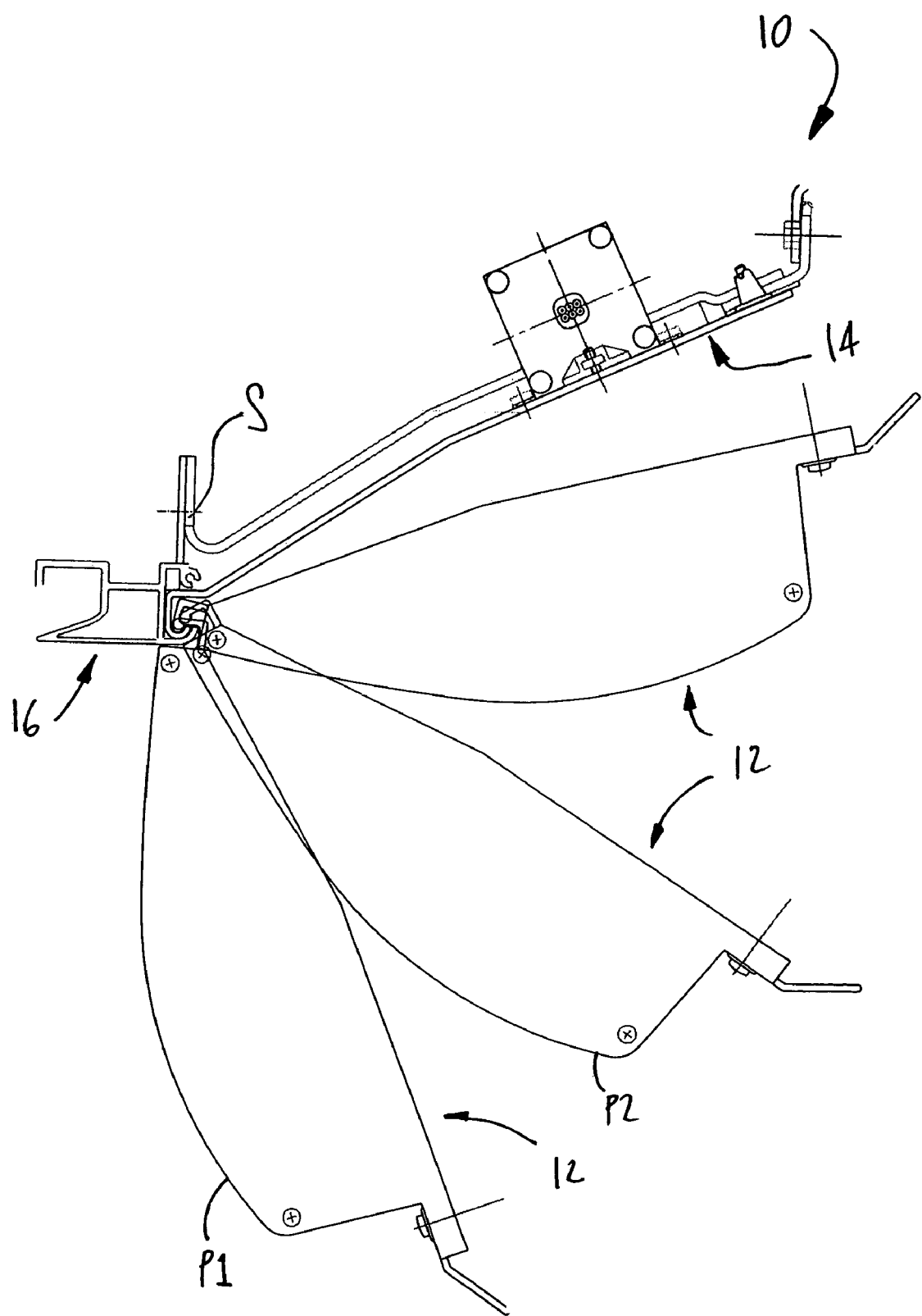
FIG. 2 is a side elevation view of the luminaire assembly of FIG. 1, with a lens member in various maintenance positions.

In order to access an interior of the luminaire assembly 10, the fastener connector 24 is released such that the lens member 12 may freely pivot with respect to the hinge member 16. As shown in FIG. 2, the lens member 12 is illustrated in various opened positions with respect to the structure S.

Position P1 represents the pivoting limit of the lens member 12, at which the lens member 12 is supported by the hinge member 16 so as to be immovable. Therefore, an operator accessing an interior of the luminaire assembly 10 may pivot the lens member 12 to position P1, at which position the lens member 12 rests immovable such that the operator has his/her hands free to attend other components of the luminaire assembly 10.

Figure 3:
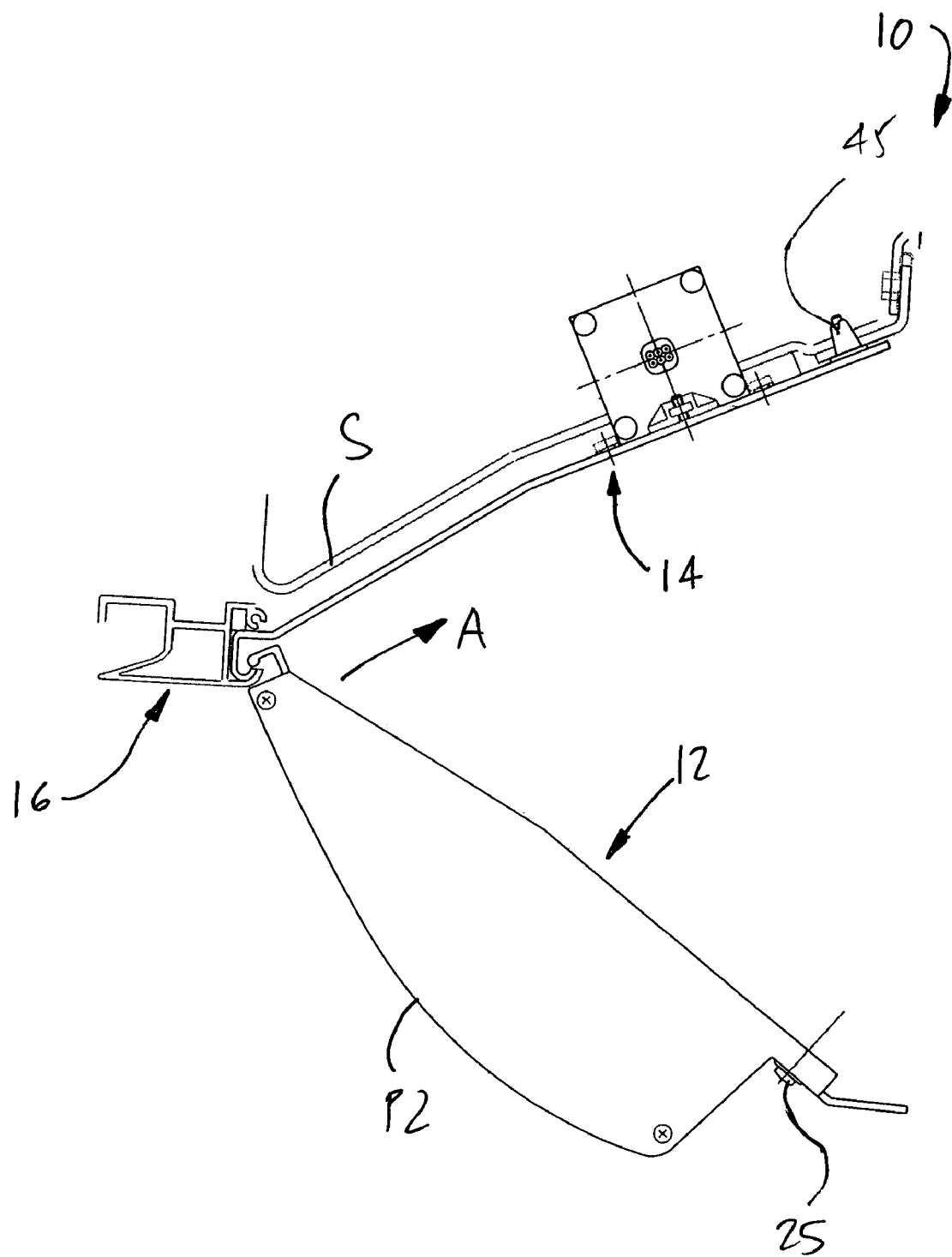
FIG. 3 is a side elevation view of the luminaire assembly of FIG. 1, with the lens member being removed.

Referring to FIG. 3, the lens member 12 is shown in position P2, at which a pull in direction A dislodges the hinge connector 23 of the lens member 12 from the hinge member 16, such that the lens member 12 may be removed from a remainder of the luminaire assembly 10. Therefore, the configuration of the hinge connector 23 with respect to the hinge connector 44 of the reflector member 14 and to the hinge member 16 facilitates removal of the lens member 12, for instance for maintenance, replacement or the like.

Figure 4:
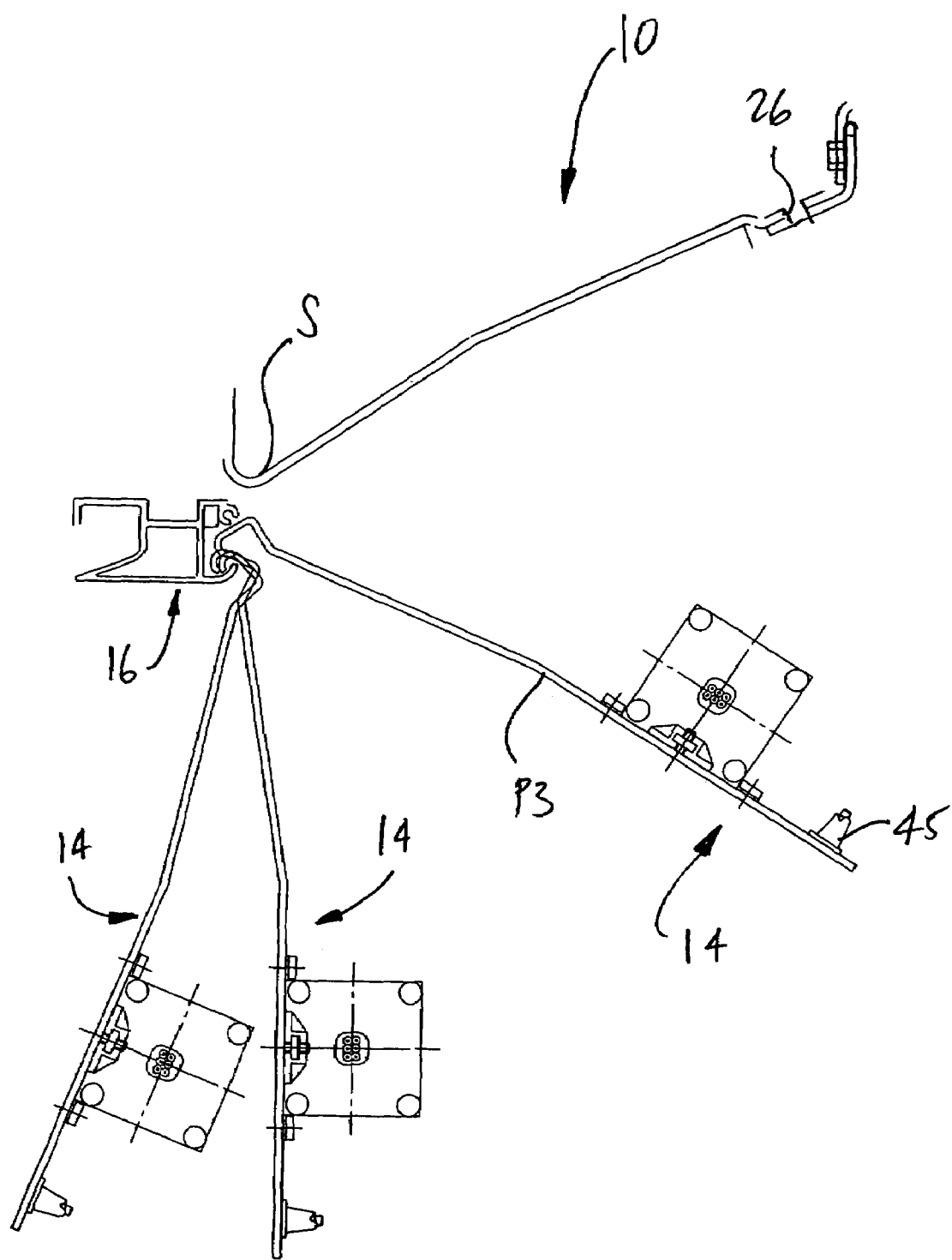
FIG. 4 is a side elevation view of the luminaire assembly of FIG. 1, with a reflective member in various maintenance positions.

In FIG. 1, the reflector member 14 is in the lighting position. To access the hidden surface of the reflector member 14, the fastener connector 45 is released, so as to enable the reflector plate 40 to pivot with respect to the hinge member 16 and reach a maintenance position, as illustrated in FIG. 4. In position P3, a pull in direction A dislodges the hinge connector 44 of the reflector member 14 from the hinge member 16, such that the reflector member 14 may be removed from a remainder of the luminaire assembly 10 for instances of maintenance, replacement or the like.

Therefore, the interior of the luminaire assembly 10 is readily accessed, with minimal use of tools. However, the fastener connector 24 of the lens member 12 is typically a bolt, such that a tool is required to release the lens member 12 from the structure S. It is preferred to have a connector requiring a tool to be released, to restrict access to the interior of the luminaire assembly 10, for example, to potential vandals.

On the other hand, the reflector member 14 may be releasably secured to the structure S by fasteners releasable without tools (e.g., detent, pivotable cam, latch pin), as the fastener connector 45 can only be accessed once the lens member 12 has been released from the lighting position.

To attend to the light source 42, only the lens member 12 needs to be opened. If the operator needs to attend to the ballast 43, the reflector member 14 is opened. As shown concurrently in FIGS. 4 and 6, the luminaire assembly 10 of the present invention is positioned such that the access to the interior of the luminaire assembly 10, when the lens member 12 is in the opened position, faces toward the alley of the vehicle, to facilitate maintenance of the luminaire assembly 10. Moreover, the fastener connectors (25 and 45) are on the alley side, also to facilitate the access to the interior of the luminaire assembly 10.

Lighting with the Luminaire Assembly 10

Figure 5:
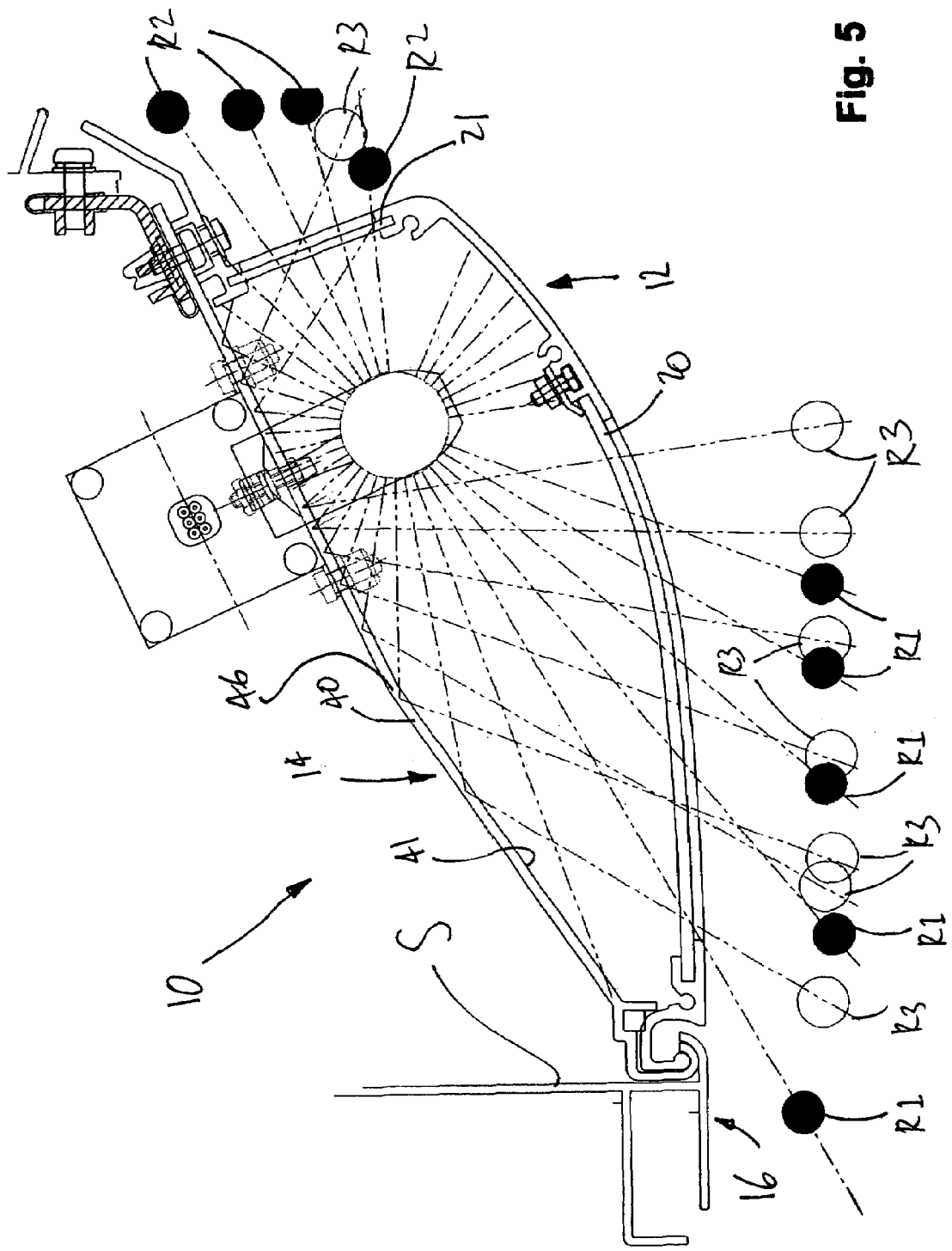
FIG. 5 is a cross-sectional view of the luminaire assembly of FIG. 1, schematically illustrating rays emitted by a light source of the luminaire assembly.
Figure 6:
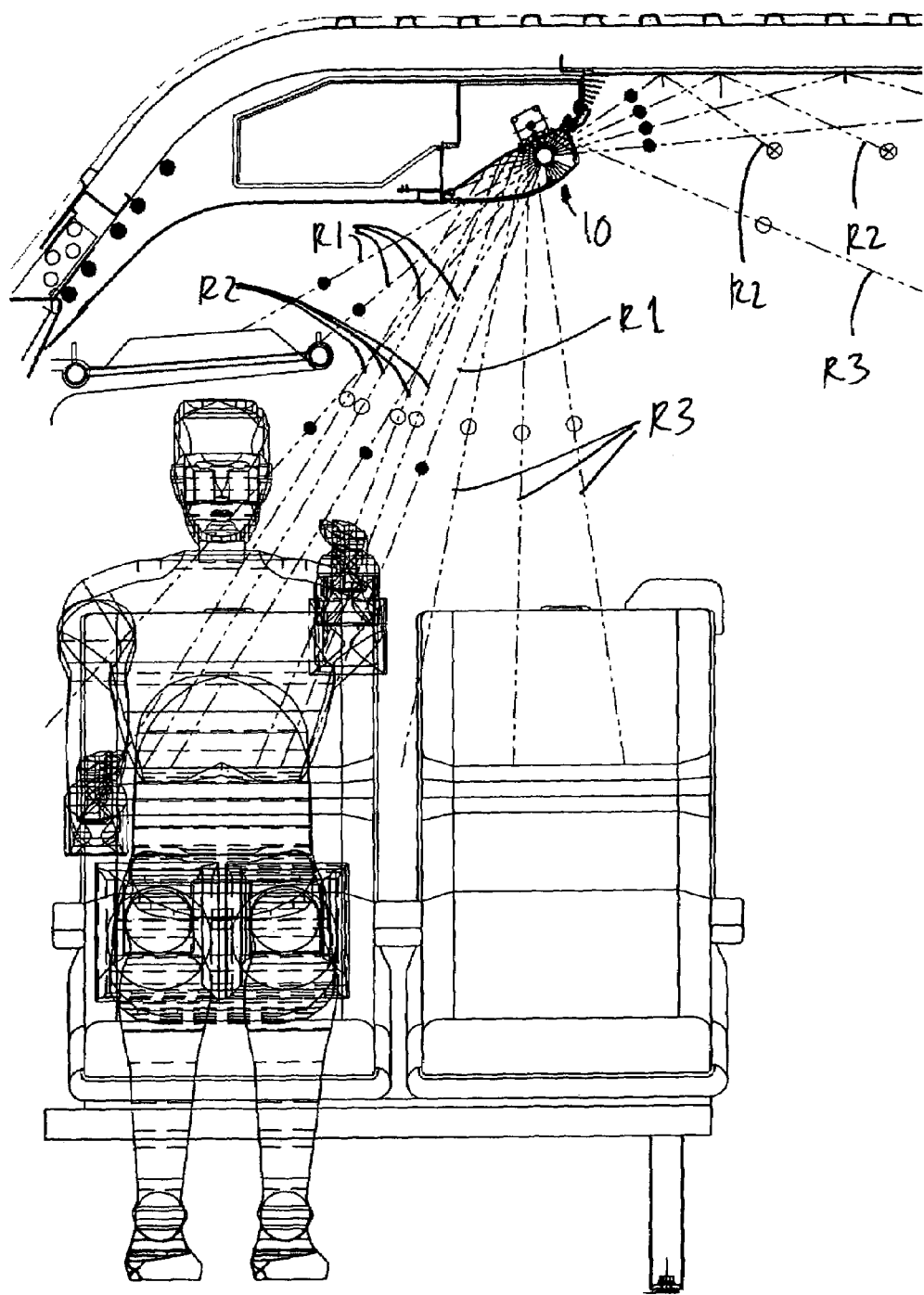
FIG. 6 is a side elevation view of the luminaire assembly of FIG. 1, schematically illustrating rays emitted by the light source with respect to a passenger seating area of a vehicle.

Referring concurrently to FIG. 6, the luminaire assembly 10 is shown positioned with respect to the passenger seating area. As shown in both FIGS. 5 and 6, the first lens 20 of the lens member 12 is positioned so as to allow some light from the light source 42 to be directed toward the passenger seating area, as shown by rays R1. The second lens 21 of the lens member 12 is positioned so as to allow some light from the light source 42 to be directed toward the ceiling of the vehicle, as shown by rays R2. Some light emitted by the light source 42 and directed toward the reflective surface 41 will be reflected out of the luminaire assembly 10 through the first lens 20 and the second lens 21 of the lens member 12, as shown by rays R3.

It is pointed out that the reflector member 14 is shaped so as to control a direction of the light reflected thereon. More specifically, referring to FIG. 5, it is shown that the reflective member 14 is bent at point 46, so as to optimize the amount of light reflected on the reflective surface 41 and out of the luminaire assembly 10 through the first lens 20.

Therefore, the configuration of the luminaire assembly 10 enables the combination of direct lighting, as shown by R1, indirect lighting, as shown by R2, and semi-direct lighting, as shown by R3. The type of material used for the lenses 20 and 21 will also affect the intensity of the light at the passenger seating area, so as to provide a lighting of selected intensity.

The luminaire assembly 10 of the present invention is well suited for being used in public transport vehicles, such as buses, trains, tramways, boats. Moreover, it is contemplated to use the luminaire assembly of the present invention in public areas of off-shore rig platforms.

FIGS. 7 and 8 illustrate the ornamental configuration of the luminaire assembly 10, with respect to the structure S of the vehicle.

It is within the ambit of the present invention to cover any obvious modifications of the embodiments described herein, provided such modifications fall within the scope of the appended claims.

The invention claimed is:

1. A luminaire assembly comprising:
a hinge member connected to a structure;
a light source adapted to be connected to a power source through electrical components to produce light;
an outer shell having a translucent portion and being operatively connected to the hinge member such as to be pivotable between a closed position, in which the outer shell conceals the light source within the luminaire assembly and allows light from the light source to pass therethrough to light up an environment of the luminaire assembly, and an opened position, in which the outer shell is pivoted away to allow access to an interior of the luminaire assembly; and
a support member having a front side supporting the light source and a backside supporting the electrical components associated with the light source, the support member being operatively connected to the hinge member such as to be pivotable about a pivot axis coincident with a pivot axis of the outer shell, between a lighting position, in which the front side is exposed within the luminaire assembly such that the light source is in an operative position and is accessible, and a maintenance position, in which the backside of the support member is exposed within the luminaire assembly so as to allow access to the electrical components.

2. The luminaire assembly according to claim 1, wherein the support member is releasably connected to the hinge member.

3. The luminaire assembly according to claim 1, wherein the outer shell is releasably connected to the hinge member.

4. The luminaire assembly according to claim 1, wherein the hinge member has a hinge portion defining a first receptacle in which a first hinge connector of the support member is nested, the first hinge connector defining a second receptacle in which a second hinge connector of the outer shell is nested, such that the outer shell and support member are individually and detachably pivotable with respect to the hinge member.

5. The luminaire assembly according to claim 1, wherein the hinge member is an extruded member having a conduit portion through which ventilation air circulates.

6. The luminaire assembly according to claim 1, wherein the electrical components have a ballast connected to the light source, the ballast being supported on the backside of the support member.

7. The luminaire assembly according to claim 1, wherein the support member is lockable in the lighting position using a first mechanical fastener which is inaccessible when the outer shell is in the closed position.

8. The luminaire assembly according to claim 7, wherein the outer shell is lockable in the closed position using a second mechanical fastener requiring the use of a given tool to be removed.

9. The luminaire assembly according to claim 1, wherein the front side of the support member is reflective.

10. The luminaire assembly according to claim 9, wherein the support member is bent to control a direction of light reflected by the front side of the support member.

11. A luminaire assembly comprising:

a hinge member connected to a structure and having a hinge portion defining a first receptacle;

a light source adapted to be connected to a power source through electrical components to produce light;

an outer shell having a translucent portion and being operatively connected to the hinge member such as to be pivotable between a closed position, in which the outer shell conceals the light source within the luminaire assembly and allows light from the light source to pass therethrough to light up an environment of the luminaire assembly, and an opened position, in which the outer shell is pivoted away to allow access to an interior of the luminaire assembly; and a support member having a front side supporting the light source and a backside supporting the electrical components associated with the light source, the support member having a first hinge connector nested in the first receptacle of the hinge portion such as to be pivotable between a lighting position, in which the front side is exposed within the luminaire assembly such that the light source is in an operative position and is accessible, and a maintenance position, in which the backside of the support member is exposed within the luminaire assembly so as to allow access to the electrical components, the first hinge connector defining a second receptacle in which a second hinge connector of the outer shell is nested, such that the outer shell and support member are individually and detachably pivotable with respect to the hinge member.

12. The luminaire assembly according to claim 11, wherein the support member is releasably connected to the hinge member.

13. The luminaire assembly according to claim 11, wherein the outer shell is releasably connected to the hinge member.

14. The luminaire assembly according to claim 11, wherein the hinge member is an extruded member having a conduit portion through which ventilation air circulates.

15. The luminaire assembly according to claim 11, wherein the electrical components have a ballast connected to the light source, the ballast being supported on the backside of the support member.

16. The luminaire assembly according to claim 11, wherein the support member is lockable in the lighting position using a first mechanical fastener which is inaccessible when the outer shell is in the closed position.

17. The luminaire assembly according to claim 16, wherein the outer shell is lockable in the closed position using a second mechanical fastener requiring the use of a given tool to be removed.

18. The luminaire assembly according to claim 11, wherein the front side of the support member is reflective.

19. The luminaire assembly according to claim 18, wherein the support member is bent to control a direction of light reflected by the front side of the support member.

* * * * *